(12) United States Patent
Takahashi et al.

(10) Patent No.: US 6,313,947 B1
(45) Date of Patent: Nov. 6, 2001

(54) LIGHT POLARIZING GLASS CONTAINING COPPER PARTICLES AND PROCESS FOR PREPARATION THEREOF

(75) Inventors: Takeshi Takahashi, Tokorosawa; Tajima Hidemi, Hamura; Hiroshi Kato, Akishima; Hisayoshi Toratani, Tokyo, all of (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/274,469

(22) Filed: Mar. 23, 1999

Related U.S. Application Data

(60) Division of application No. 08/175,535, filed on Dec. 30, 1993, now abandoned, which is a continuation-in-part of application No. 07/959,355, filed on Oct. 13, 1992, now abandoned.

(30) Foreign Application Priority Data

Oct. 14, 1991 (JP) .................................................. 3-293616

(51) Int. Cl.⁷ .............................. G02B 27/28; C03C 3/11; C03C 3/091
(52) U.S. Cl. ................................ 359/492; 501/56; 501/66
(58) Field of Search ..................................... 359/492, 483, 359/485; 252/585; 65/33.3, 388; 501/56, 59, 66

(56) References Cited

U.S. PATENT DOCUMENTS

| | | |
|---|---|---|
| 3,653,741 | 4/1972 | Marks .................................. 359/486 |
| 3,954,485 | 5/1976 | Seward et al. ......................... 501/13 |
| 4,479,819 | 10/1984 | Borelli et al. ....................... 65/30.11 |
| 4,908,054 | 3/1990 | Jones et al. ......................... 65/30.11 |
| 5,040,863 | 8/1991 | Kawakami et al. ................. 359/484 |
| 5,281,562 | * 1/1994 | Araujo et al. . |

OTHER PUBLICATIONS

Journal of Non–Crystalline Solid, 33 (1979) 383–391, Tick et al. "Polarization Effects in Stretched Copper Cadmium Chloride Photochromic Glasses".

"Micrstructure and Third–Order Optical Nonlinearity of CuCl Microcrystallite–Doped Glasses", Setsuro Ito, Nov. 26, 1990 (partial translation, Abstract in English).

* cited by examiner

Primary Examiner—Jordan M. Schwartz
(74) Attorney, Agent, or Firm—Sughrue, Mion, Zinn, Macpeak & Seas, PLLC

(57) ABSTRACT

A light polarizing glass article comprising a base glass and metallic copper particles dispersed in said base glass wherein said metallic copper particles have aspect ratios in the range of from about 2:1 to 15:1 and said base glass is selected from the group consisting of silicate, borosilicate, borate and phosphate glasses which contain at least one reductant element. The article is prepared by heating a batch of glass containing copper and halogen containing constituents to develop copper halide particles in the glass, elongating said glass containing copper halide particles at a temperature where said glass exhibits a viscosity of from $1\times10^8$ to $1\times10^{11}$ poises, and reducing at least a portion of the copper halide particles in the elongated glass to produce metallic copper particles therein. An optical isolator employing the above light polarizing glass articles is also provided.

6 Claims, 9 Drawing Sheets

LIGHT POLARIZING GLASS CONTAINING COPPER PARTICLES AND PROCESS FOR PREPARATION THEREOF

This is a divisional of application Ser. No. 08/175,535 filed Dec. 30, 1993, now abandoned, which is a continuation-in-part application of application Ser. No. 07/959,355 filed Oct. 13, 1992, now abandoned.

BACKGROUND OF THE INVENTION

The present invention relates to light polarizing glass articles, a process for preparation thereof and an optical isolator using such glass articles. The light polarizing glass articles of this invention make it possible to reduce in size the optical isolators utilized in optical communication techniques using semiconductor lasers and optical fibers.

Optical isolators are used to cut off the backward light caused by reflection to improve the S/N ratio in optical fiber communication techniques utilizing semiconductor lasers at a wavelength of 1.31 $\mu$m or 1.55 $\mu$m as a light source. The optical isolators basically comprise a Faraday rotational element, two polarizers and a magnet, and it is necessary to reduce the size of each element to miniaturize the isolators. It is difficult, however, to miniaturize polarizers while maintaining its extinction ratio and environment resistance.

Polarizing glasses in which metal particles having large aspect ratios are aligned seemed to satisfy the above requirements. U.S. Pat. No. 3,954,485 discloses polarizing glasses and glass articles containing copper. According to the patent, the articles are prepared as follows. An aluminoborosilicate based glass containing halogen elements and copper oxide and/or cadmium oxide (in one example, copper oxide and cadmium oxide) was heated to a temperature of from 500 to 900° C. to cause the development therein of second phase droplets having a size of 100–1000 Å, which is a boron rich glassy phase containing copper and cadmium halides. The resulting glass article was elongated by a factor of about 50, at which time the second phase droplets therein achieve aspect ratios in the range of 2:1 to 5:1 as the temperature of the glass article is adjusted such that the glass exhibits a viscosity in the range of $1 \times 10^7$ to $1 \times 10^9$ poises. The glass article was then cooled to a temperature below the annealing point thereof to obtain the polarizing glass article.

Since the glass articles are provided for the purpose of eye-glasses, the size of the second phase is less than 1000Å (100 nm) in order to keep the articles transparent in the visible light range. The articles also exhibit photochromic properties. Further, the glass article exhibits polarizing properties in the darkened state (the colored state caused by irradiation of light) as obtained by irradiation of light with a short wavelength (e.g. 0.3–0.45 $\mu$m). However, in the darkened state, the extinction ratio of the glass articles is about 10:1 (10 dB) which is smaller than the extinction ratio (30 dB) required for an optical isolator used in optical communication.

The reasons why the extinction ratio of the glass articles is smaller are described in U.S. Pat. No. 3,954,485 and a report in Journal of Non-crystalline Solid, Vol. 33, pp 383–390 (1979). That is, the second phase droplets in the glass containing copper, cadmium and chlorine have a structure comprising a spherical droplet which ranges from 100 to 1000 Å in diameter and is a borate rich glassy phase. The glasses also comprise a smaller particle structures, ranging from 20 to 50 Å in diameter, which consist of copper chloride and cadmium chloride and provide photochromic properties to the glass. The spherical second phase droplet is elongated by redrawing of the glass, while the smaller particle structure is not elongated. This is because elongation of the smaller particles requires more stress and is hard to occur since the particle size of the smaller particle is too small.

The reasons why the glass exhibits weak polarizing properties are that the smaller particles consisting of copper and cadmium chlorides are aligned anisotropically on the surface of the elongated second phase particles.

It is impossible to change the glass to the darkened state by irradiation of the infrared light with a wavelength of 1.3–1.55 $\mu$m which is usually used in optical communication techniques, and therefore, the extinction ratio of the glass obtained by the irradiation of the infrared light is extremely low. Thus it is impossible to apply the copper containing glass disclosed in U.S. Pat. No. 3,954,485 to polarizers used in optical isolators for the optical communication techniques.

U.S. Pat. No. 4,479,819 discloses a preparation of polarizing glass articles wherein silver halide particles are generated in a glass body, this glass body is elongated such that the particles are elongated to an aspect ratio of at least 5:1 and the elongated glass body is exposed to a reducing environment to reduce the silver halide particles in the glass to metallic silver.

Silver halide particles with relatively small size is required to obtain anisotropic metallic silver particles exhibiting polarizing properties. However, it is difficult to form anisotropic silver halide particles with small size by elongation of a glass body containing silver halide particles. Further, unreduced silver halide particles remained in the glass exhibit large scattering loss, and a polarizing glass with the scattering loss is not preferred.

U.S. Pat. No. 3,653,741 discloses articles comprising a matrix having dispersed substantially uniformly therethrough a plurality of electro-optically responsive dipole particles. Examples of the dipole particles include copper particles and glass is exemplified as the matrix. It is disclosed that continuous drawing methods may be employed using a glass melt containing dipoles, and the drawing and rolling of the glass will cause the orientation of the dipolar particles to produce polarized glass.

It is necessary that dipole Cu particles such as Cu whiskers are uniformly dispersed in glass melt in order to produce polarizing glasses containing dipole Cu particles. However, if a temperature of glass melt is too high or if dispersion of the whiskers is required a relatively long term, polarizing glasses are not obtained because Cu whiskers melt to form Cu spheres or are oxidized to form Cu ions. Thus glasses with relatively low Tg and melting points should be used to form polarizing glasses by the method described in U.S. Pat. No. 3,653,741.

On the other hand, when assembling optical isolators, polarizing glasses are partially melted and adhered by heating at a high temperature, for example, at about 400–450° C. Thus polarizing glass used for the optical isolators should have heat resistance. However, base glasses for the polarizing glasses made by the method of the above U.S. Patent are limited to glasses with low Tg and melting point, but such polarizing glasses are not heat resistant.

An object of the invention is to provide a polarizing glass article containing metallic copper, which exhibits good heat resistance and a high extinction ratio in the infrared region used in optical communication techniques, and a process for preparation thereof. Another object of the invention is to provide an optical isolator useful for optical communication using the polarizing glass article which is a miniature polarizer.

SUMMARY OF THE INVENTION

The present invention relates to a light polarizing glass article comprising a base glass and metallic copper particles dispersed in said base glass wherein said metallic copper particles have aspect ratios in the range of from about 2:1 to 15:1 and wherein said base glass is selected from the group consisting of silicate, borosilicate, borate and phosphate glasses which contain at least one reductant element.

In another embodiment, the present invention provides a process for the preparation of a light polarizing glass article comprising a base glass and metallic copper particles dispersed in said base glass wherein said metallic copper particles have aspect ratios in the range of from about 2:1 to 15:1 and wherein said base glass is selected from the group consisting of silicate, borosilicate, borate and phosphate glasses which contain at least one reductant element comprising (1) heating a batch of glass which contains copper and halogen, but not cadmium, to deposit copper halide (CuX, wherein X means halogen) particles in the glass, (2) elongating said glass at a temperature at which said glass exhibits a viscosity of from $1 \times 10^8$ to $1 \times 10^{11}$ poises, and (3) reducing at least part of the copper halide particles in the elongated glass to produce metallic copper particles therein.

DETAILED DESCRIPTION OF THE PREFERRED EMBODIMENTS

Figure 1:
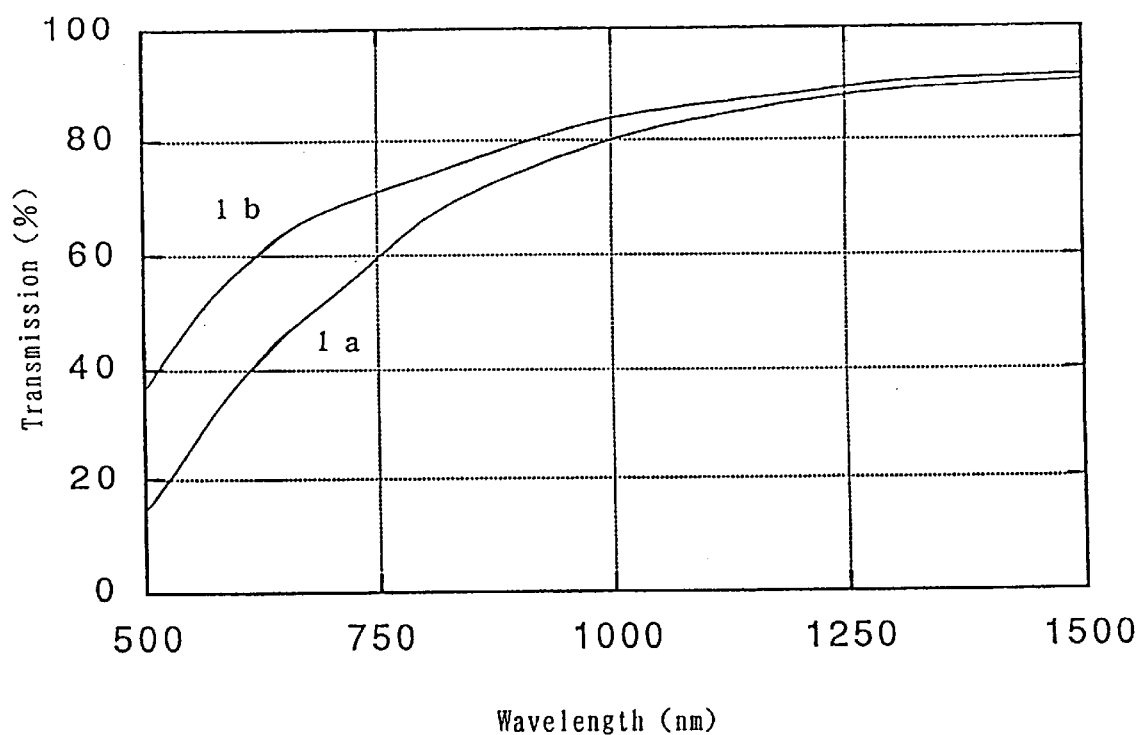
FIG. 1 shows transmission curves (1a and 1b) of the glass (thickness: 1 mm) of Example 1 prior to reduction.

The polarizing glass of the invention contains metallic copper particles having aspect ratios in the range of from about 2:1 to 15:1. An aspect ratio is a ratio of length and breadth, with the length being the measurement of the longest side of the particle and the breadth being the measurement perpendicular to the length or the width. The aspect ratio is the factor which determines the absorption of radiation parallel to the lengthwise direction of the metallic copper particles and the absorption of radiation perpendicular to the lengthwise direction of the metallic copper particles.

In order to obtain metallic copper particles which exhibit good polarizing properties in the infrared region of a wavelength of from 1.3 to 1.55 μm, it is preferred that the aspect ratios of the particles suitably ranges from 2:1 to 15:1. This is because the particles having an aspect ratio of less than 2:1 exhibit polarizing properties in the visible light region. On the other hand, particles exhibiting an aspect ratio of more than 15:1 demonstrate good polarizing properties in the mid—infrared region or in the far—infrared region.

Glasses containing metallic copper particles exhibit polarizing properties, but those containing copper compounds other than metallic copper do not exhibit sufficient polarizing properties. Glasses containing both metallic copper and other copper compounds, such as copper halides, do exhibit polarizing properties.

In the present invention, base glasses are selected from the group consisting of silicate, borosilicate, borate and phosphate glasses. This is because these base glasses should have high Tg and melting points and the resulting polarizing glasses have excellent heat resistance. Further the base glasses used in this invention contain at least one reductant element such as $Sn^{2+}$, $As^{3+}$, $Mn^{2+}$, or $Co^{2+}$ to maintain copper element of copper halides particles to $Cu^+$. This is because a diffusion rate of $Cu^+$ is much higher than that of $Cu^{2+}$ and a formation of larger CuCl particles in glass is much easier than that of $CuCl_2$ particles.

$Sn^{2+}$ is generally contained in a base glass in the form of SnO. SnO is suitably contained in the base glass in the range of from 0.01 to 1.0 wt %, preferably from 0.03 to 0.6 wt %, more preferably from 0.07 to 0.5 wt %.

A process for preparation of the polarizing glass articles of the present invention will be further described below.

In this invention, glasses containing copper and halogen containing constituents and at least one reductant element are used as starting materials.

Examples of suitable glasses include silicate or borosilicate glasses having a composition, expressed in terms of weight %, 48–65% of $SiO_2$, 13–33% of $B_2O_3$, 6–13% of $Al_2O_3$, 0–5% of $AlF_3$, 7–17% of alkali metal oxides ($Li_2O$, $Na_2O$, $K_2O$, $Rb_2O$, $Cs_2O$), 0–5% of alkali metal chlorides (LiCl, NaCl, KCl, RbCl, CsCl), 0–5% of alkali earth metal oxide (MgO, CaO, SrO, BaO), 0.5–2.5% of the sum of copper oxide ($Cu_2O$) and copper halides (CuCl, CuBr, etc), 0.01–1.0% of SnO and 0–5% of $As_2O_3$.

Further examples of suitable glasses include borate or borosilicate glasses having a composition, expressed in terms of weight %, 40–75% of $B_2O_3$, 0–40% of $SiO_2$, 4–20% of $Al_2O_3$, 1–15% of alkali metal oxides ($Li_2O$, $Na_2O$, $K_2O$, $Rb_2O$, $Cs_2O$), 0–4% of alkail metal chlorides (LiCl, NaCl, KCl, RbCl, CsCl), 0–15% of alkali earth metal oxide (MgO, CaO, SrO, BaO), 0.5–2.5% of total of copper oxide ($Cu_2O$) and copper halides (CuCl, CuBr, etc) and 0.01–1.0% of SnO.

Other examples of suitable glasses include phosphate glasses having a composition, expressed in terms of weight %, 5–60% of $P_2O_5$, 1–35% of $SiO_2$, 5–40% of $B_2O_3$, 1–30% of $Al_2O_3$, 0–5% of $AlF_3$, 1–30% of alkali metal oxides ($Li_2O$, $Na_2O$, $K_2O$, $Rb_2O$, $Cs_2O$), 0–5% of alkali chlorides (LiCl, NaCl, KCl, RbCl, CsCl), 0–5% of alkali earth metal oxides (MgO, CaO, SrO, BaO), 0.5–2.5% of total of copper oxide ($Cu_2O$) and copper halides (CuCl, CuBr, etc) and 0.01–1.0% of SnO.

In-order to prepare the glasses having the above composition, carbonates, nitrates, hydroxides, halides, phosphates and the like may be used as starting materials. Since halides tend to vaporize during melting steps, it is preferred that the halides are added to the glass batch in a slight excess to the equivalent weight of copper. After melting of the glass batch, the resulting melt is cooled to room temperature to produce a glass containing copper and halogen.

The resultant glass is then reheated to develop copper halide particles (for example, CuCl, CuF, CuBr, CuI or mixed crystals such as $CuF_{1-x}Cl_x(0<x<1)$. The reheating is conducted at a temperature of preferably from 650–850° C. A longer period of time is required to develop a sufficient amount of copper halide particles at a temperature less than 650° C. At a temperature higher than 850° C., it is difficult to control the particle size of the copper halide by adjusting the period of reheating time, since the rate at which the copper halide particles develop is too fast. Copper halide particles of a larger particle size are more easily elongated, but tend to increase scattering loss in the polarizing glass. Thus the particle size of the copper halide particles which develop in the glass suitably ranges from 50 to 300 nm. The particle size is obtained by heating the glass at the above mentioned temperature, generally for a period of time ranging from 1–10 hrs.

The reheated glass is stretched at a temperature at which the glass containing the copper halide particles exhibits a viscosity of from $1\times10^8$ to $1\times10^{11}$ poises. The stretching elongates the copper halide particles into a prolate shape. The reasons the viscosity of the glass is adjusted to between $1\times10^8$ and $1\times10^{11}$ poises during the stretching are as follows. If the glass is heated to a temperature at which the glass demonstrates a viscosity of lower than $1\times10^8$ poises, the elongated particles tend to return to a spherical shape. If the glass is heated to a temperature at which the glass exhibits a viscosity of higher than $1\times10^{11}$ poises, the glass will tend to break during the stretching. The temperature at which the glass exhibits the above viscosity may be varied when taking into consideration the composition of the glass, and can be chosen easily.

The stretching of the glass is conducted to the extent that the aspect ratios of the copper halide particles ranges from about 8:1 to 60:1. The copper halide particles with aspect ratios ranging from 8:1 to 60:1 are converted to metallic copper particles with aspect ratios ranging from about 2:1 to 15:1 by the subsequent reduction treatment. This is because the reduction of the copper halide particles to the metallic copper particles is accompanied by a volume shrinkage of about 70%. It is provided that the glass containing the copper halide particles having aspect ratios within the above range do not exhibit photochromic properties and demonstrate weak polarizing properties.

The elongation of the copper halide particles can be carried out by stretching, extrusion, rolling or pressing of the glass containing the copper halide particles. The aspect ratios of the copper halide particles can be varied by changing the conditions of elongation. It is possible to form a stretched glass in which copper halide particles are elongated at a constant aspect ratio and are aligned along the direction of the length by varying the glass viscosity or stretching rate, or by moving the overheating zone of the glass.

In the case where a glass is stretched, the elongating load is varied by glass viscosity and elongating rate, and can be adjusted to, for example, 100 kg/cm² within the above temperature range. It is preferred that the elongated glass is rapidly cooled to a temperature lower than the annealing point of the glass in order to prevent copper halide particles from returning to a spherical shape.

The elongated glass is then subjected to a reduction treatment to reduce a portion or all of the copper halide particles contained in the glass. It is preferred to polish the surface of the glass to form a desired shape in advance to the reduction treatment.

In order to obtain a glass exhibiting sufficient polarizing properties, it is necessary to reduce at least a portion of the copper halide particles in the elongated glass. The reduction is conducted by heating the glass in an atmosphere of, for example, hydrogen. The conditions of the reduction, especially the reduction temperature, is important since the particles should be reduced while keeping their prolated shapes, and copper has three valences (0, 1 and 2). If the reduction temperature is relatively low, the metallic particles can keep their prolated shapes, but it is necessary to reduce the glass for a long period of time to form a glass exhibiting good polarizing properties. If the reduction temperature is relatively high, it is possible to form a reduced layer of a necessary thickness, which exhibits good polarizing properties, but the viscosity of the heated glass becomes too low to maintain the prolated shapes of the metallic particles.

It is possible to elongate the copper halide particles into particles exhibiting greater aspect ratios than those exhibited by the particles to be reduced at a temperature at which the metallic copper particles can keep their prolated shapes, and reduce the particles with greater aspect ratios at a slightly high temperature at which the metallic particles gradually form a spherical shape. Under these conditions, a reduced layer with sufficient thickness can be formed for a short period of time.

The reduction conditions vary in accordance with the composition of the glass. The reduction treatment is generally conducted by reducing the glass at a temperature in the range of from 350 to 550° C., preferably from 350 to 550° C. for a period of time from 30 minutes to 10 hours, to obtain a glass with good polarizing properties. Under the above conditions, the copper halide particles at a distance of from about 1 to 120 $\mu$m from the surface of the glass are reduced. As a result, with respect to a relatively thin glass plate (a glass plate thinner than about 240 $\mu$m), almost all the copper halide particles therein are reduced to metallic copper to form a polarizing glass in which the resulting metallic copper particles are dispersed anisotropically. With respect to a relatively thick glass plate, the resulting metallic copper particles are dispersed anisotropically in the surface layers and unreduced copper halide particles are dispersed within the inner part of the glass. That is, the glass will have a three layer structure.

Although the above explained reduction conditions are directed to reduction with hydrogen, reducing gases other than hydrogen can be employed, with the conditions being chosen properly. Examples of other reducing gases include $CO-CO_2$ gas.

The aspect ratios, a volume ratio and size of the copper particles, as well as, the thickness of the reduced layer of copper particles, influence the polarizing properties of the resulting glass. If the glass has an unreduced layer, the size and volume ratio of the copper halide particles, and thickness of the unreduced layer also influence the polarizing properties of the resulting glass. The volume ratio of the copper particles is the product of the volume of one elongated copper particle observed by a transmission electron microscope and the density of the particle (the number of particles contained in a unit volume of the glass). The volume ratio of copper particles influence the absorption coefficient. A volume ratio of less than $1\times10^{-4}$ is too small, and therefore a thick reduction layer is required to provide sufficient polarizing properties. On the other hand, a volume ratio of more than $1\times10^{-2}$ is generally too large, and scattering resulting from the copper halide particles in the unreduced layer increases to result in undesirable scattering loss even though the reduced layer can be thin. The content of copper halide particles can influence the volume ratio of copper particles and is varied by the heat treatment conditions, and suitably ranges from 0.5 to 2.5 weight %.

The polarizing glass articles of the present invention do not exhibit photochromic properties. In addition, the articles demonstrate 30 dB or more of extinction ratio by irradiation of light having a wavelength of 1.3–1.55 $\mu$m without irradiation of light with a short wavelength since at least a part of the copper halide particles therein are reduced to the metallic copper particles. The absorption of the glass articles of the present invention is relatively broad and therefore, the articles exhibit good polarizing properties both at 1.31 $\mu$m and at 1.55 $\mu$m, which wavelengths are used in the optical communication industry.

According to the present invention, it is easy to control the amount and aspect ratios of the metallic copper particles contained in the polarizing glass article such that the glass articles exhibits an excellent extinction ratio.

Figure 7:
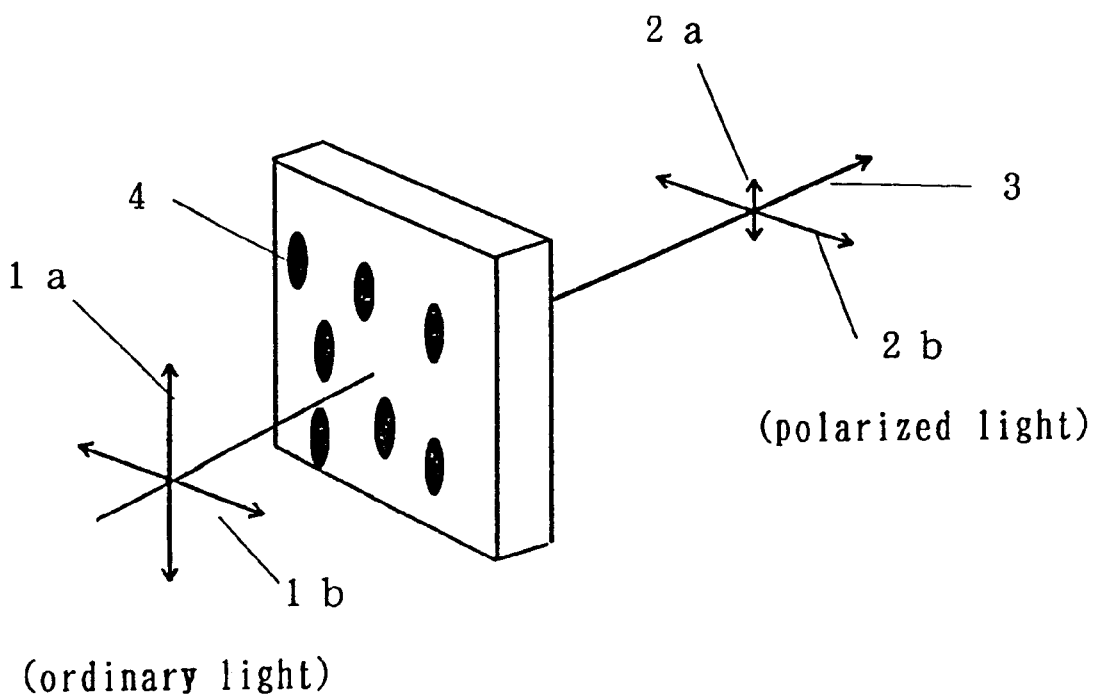
FIG. 7 is an explanatory chart of polarization phenomena.

The present invention relates to a polarizing glass which transmits linear polarizing light with only one direction. Linear polarizing light is the light which has an electrical field vector directed in one direction. As shown in FIG. 7, ordinary light consists of two components, 1$a$ and 1$b$ perpendicular to 1$a$. When light runs through a glass containing fine metallic particles 4 having an anisotropic shape, component 1$b$ which is perpendicular to the length of the articles (that is, parallel to the breadth of the particles) is absorbed less than component 1$a$, which is parallel to the length of the articles. The absorbance of components 1$a$ and 1$b$ are measured separately by a spectrophotometer. The differences in absorption between components 1$a$ and 1$b$ result in a polarizer which transmits linear polarized light.

An optical isolator of the present invention comprises a Faraday rotational element and at least one polarizer, which preferably comprises a Faraday rotational element, two polarizers and at least one magnet. The copper containing polarizing glass of the present invention is used as the polarizer.

It is possible to produce an optical isolator having a thickness which is thinner than an aperture (the effective beam diameter), and which exhibits good extinction ratio in the infrared region, by the use of the polarizing glass articles of the present invention. This isolator is preferably used in the optical communication techniques. The isolator can be embedded in a single mode fiber since it is thin.

EXAMPLE 1

A glass batch having the composition shown in Table 1 as sample (1) is prepared from $SiO_2$, $H_3BO_3$, $Al(OH)_3$, $Na_2CO_3$, NaCl, $AlF_3$, CuCl, SnO, etc, and is heated to 1450° C. (to melt) in a platinum crucible (3 liters). The melted glass is poured into a graphite mold to form a glass disk and is cooled gradually to room temperature. The resulting glass disk is reheated at 800° C. for 3 hrs to deposit CuCl particles of a size of about 150 nm in diameter in the glass. This glass does not exhibit photochroric properties. The glass disk is cut to obtain a plate (5×10×100 mn). The plate is heated to 600° C., at which temperature the glass exhibits a viscosity of about $1\times10^9$ poise, and is stretched at the rate of 100 mm/min under a load of 200 Kg/cm². As a result, the CuCl particles are elongated into a prolate shape (about 60×600 nm, aspect ratio: 10:1) and are aligned in the glass. The particle density of CuCl in the resulting glass is estimated as $2.5\times10^2$/cm³ by observation using a transmission electron microscope. The volume ratio of CuCl particles is calculated to be about $4.4\times10^{-3}$.

The resulting glass plate is polished to form a plate of about 1 mm thickness and is reduced in a hydrogen atmosphere at 500° C. for 1 hr to obtain a polarizing glass. The polarizing properties of the glass are shown in Table 1. The thickness of reduced surface layer of the plate, which contains metallic copper particles, is about 30 $\mu$m. The CuCl particles are changed to metallic copper particles exhibiting aspect ratios of about 2–3:1 (the average metallic copper particles being about 50×125 nm in size with an aspect ratio of about 2.5:1). Vacancies result from the shrinkage accompanying the reduction of the CuCl particles. The metallic copper particles develop at either end of the space occupied by the CuCl particles (now the vacancies), and have a column like shape. The calculated volume ratio of the metallic copper particles is about $1.1\times10^{-3}$.

Figure 2:
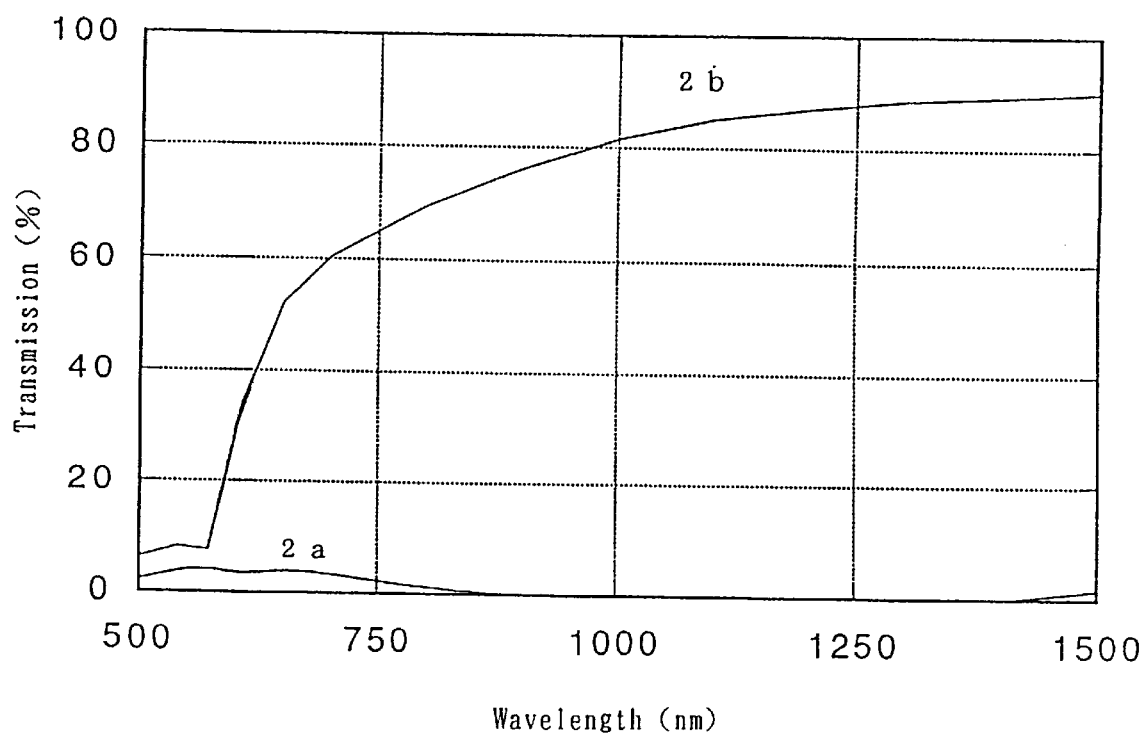
FIG. 2 shows transmission curves (2a and 2b) of the glass (thickness: 1 mm) of Example 1 after reduction.

Absorbances of the resulting plate are measured when the particles are oriented parallel to polarizing light [1$a$ (before reduction) in FIG. 1 and 2$a$ (after reduction) in FIG. 2] and when the particles are oriented perpendicular to polarizing light [1$b$ (before reduction) in FIG. 1 and 2$b$ (after reduction) in FIG. 2]. Since there are remarkable differences in the transmission between the glasses before and after reduction as shown in FIGS. 1 and 2, and since metallic copper is identified by ESCA measurement, at least a portion of the CuCl particles in the surface layer of the glass plate is reduced to form metallic copper. The above absorbances are measured without antireflection coating.

EXAMPLE 2

A glass disk having the composition shown in Table 1 as sample (2) is prepared in accordance with the same procedures as those of Example 1. The resulting glass disk is reheated at 750° C. for 5 hrs to develop CuCl particles of a size of about 250 nm in diameter in the glass. The glass disk is cut to obtain a plate (5×10×100 mm). The plate is heated to 560° C., at which temperature the glass exhibits a viscosity of about $3\times10^9$ poise, and is stretched at the rate of 100 mm/min under a load of 300 Kg/cm². As a result, the CuCl particles are elongated into a prolate shape (about 100×980 nm, aspect ratio: 10:1) and are aligned in the glass as is observed by a transmission electron microscope. The particle density of CuCl in the resulting glass is estimated as $1\times10^{12}$/cm³. The volume ratio of CuCl particles is calculated to be about $8.2\times10^{-3}$.

The resulting glass plate is polished to form a plate with about 1 mm thickness and is reduced in a hydrogen atmosphere at 470° C. for 4 hrs to obtain a polarizing glass. Polarizing properties, including the extinction ratio of the glass, are shown in Table 1. The thickness of reduced surface layer of the plate is about 40 $\mu$m. The CuCl particles are changed to metallic copper particles exhibiting aspect ratios of about 2–3:1 (the average metallic copper particles being about 75×190 nm in size with an aspect ratio of about 2.5:1). Vacancies result from the shrinkage accompanying the reduction of the CuCl particles. The metallic copper particles develop at either end of the space occupied by the CuCl particles (now the vacancies) and have a cone like shape. The calculated volume ratio of the metallic copper particles is about $2.1\times10^{-3}$.

EXAMPLE 3

A batch of glass having the composition shown in Table 1 as sample (3) is prepared from $SiO_2$, $H_3BO3$, $Al(OH)_3$, $Na_2CO_3$, AiF3, CuCl, SnO, etc, by heating to 1450° C. (to melt) in a platinum crucible (3liters). The melted glass is poured into graphite molds to form a glass disk and is cooled gradually to room temperature. The resulting glass disk is reheated at 800° C. for 3 hrs to develop CuCl particles of a size of about 150 mn in diameter in the glass. This glass does not exhibit photochromic properties. The glass disk is cut to obtain a plate (5×10×100 mm). The plate is heated to 600° C., at which temperature the glass exhibits a viscosity of about 1×10$^9$ poise, and is stretched at the rate of 100 mm/min under a load of 200 Kg/cm$^2$. As a result, the CuCl particles are elongated into a prolate shape (about 40×2000 nm, aspect ratio: 50:1) and are aligned in the glass as is observed by a transmission electron microscope. The particle density of CuCl in the resulting glass is estimated as 2.5×10$^{12}$/cm$^3$. The volume ratio of CuCl particles is calculated to be about 4.4×10$^{-3}$.

The resulting glass plate is polished to form a plate of a thickness of about 0.5 mm and is reduced in a hydrogen atmosphere at 500° C. for 1 hr to obtain a polarizing glass. Polarizing properties of the glass are shown in Table 1. The thickness of the reduced surface layer of the plate, which contains metallic copper is about 30 μm. The CuCl particles are changed to metallic copper particles exhibiting aspect ratios of about 5–14:1 (the average metallic copper particles being about 35×350nm in size with an aspect ratio of about 10:1). Vacancies result from the shrinkage accompanying the reduction of the CuCl particles. The metallic copper particles develop at either end of the space occupied by the CuCl particles (now the vacancies) and have a column like shape. The calculated volume ratio of the metallic copper particles is about 1.1×10$^{-3}$.

EXAMPLE 4

A glass disk of the glass composition shown in Table 1 as sample (4) is prepared in accordance with the same procedures as those of Example 3. The resulting glass disk is reheated at 700° C. for 5 hrs to develop CuCl particles of a size of about 170 nm in diameter in the glass. The glass disk is cut to obtain a plate (5×10×100 mm). The plate is heated to 550° C., at which temperature the glass exhibits a viscosity of about 7×10$^8$ poise, and is stretched at the rate of 150 mm/min under a load of 200 Kg/cm$^2$. As a result, the CuCl particles are elongated into a prolate shape (about 60×1400 nm aspect ratio: 23:1) and are aligned in the glass as is observed by a transmission electron microscope. The particle density of CuCl in the resulting glass is estimated as 2×10$^{12}$/cm$^3$. The volume ratio of CuCl particles is calculated to be about 5.1×10$^{-3}$.

The resulting glass plate is polished to form a plate of about 0.5 mm thickness and is reduced in a hydrogen atmosphere at 420° C. for 4 hrs to obtain a polarizing glass. Polarizing properties, including the extinction ratio of the glass, are shown in Table 1. The thickness of reduced surface layer of the plate is about 20 μm. The CuCl particles are changed to metallic copper particles exhibiting aspect ratios of about 2–8:1 (the average metallic copper particles being about 50×230 nm in size with an aspect ratio of about 4.5:1). Vacancies result from the shrinkage accompanying the reduction of the CuCl particles. The metallic copper particles develop at either end of the space occupied by the CuCl particles (now the vacancies) and have a column like shape. The calculated volume ratio of the metallic copper particles is about 1.3×10$^{-3}$.

EXAMPLE 5

A glass disk of the glass composition shown in Table 1 as sample (5) is prepared in accordance with the same procedures as those of Example 3. The resulting glass disk is reheated at 750° C. for 3 hrs to develop CuCl particles of a size of about 120 nm in diameter in the glass. The glass disk is cut to obtain a plate (4×10×180 mm). The plate is heated to 580° C., at which temperature the glass exhibits a viscosity of about 2×10$^9$ poise, and is stretched at the rate of 150 mm/min under a load of 300 Kg/cm$^2$. As a result, the CuCl particles are elongated into a prolate shape (about 35×1300 nm, aspect ratio: 37:1) and are aligned in the glass as is observed by a transmission electron microscope. The particle density of CuCI in the resulting glass is estimated to be 7×10$^{12}$/cm$^3$. The volume ratio of CuCl particles is calculated to be about 6.3×10$^{-3}$.

The resulting glass plate is polished to form a plate of about 0.5 mm thickness and is reduced in a hydrogen atmosphere at 450° C. for 3 hrs to obtain a polarizing glass. Polarizing properties, including the extinction ratio of the glass, are shown in Table 1. The thickness of reduced surface layer of the plate is about 20 μm. The CuCl particles are changed to metallic copper particles exhibiting aspect ratios of about 3–10:1 (the average metallic copper particles being about 35×250 nm in size with an aspect ratio of about 7:1). Vacancies result from the shrinkage accompanying the reduction of the CuCl particles. The metallic copper particles develop at either end of the space occupied by the CuCl particles (now the vacancies) and have a spheroid like shape. The calculated volume ratio of the metallic copper particles is about 1.6×10$^{-3}$.

EXAMPLE 6

A glass disk of the glass composition shown in Table 2 as sample (6) is prepared in accordance with the same procedures as those of Example 3. The resulting glass disk is reheated at 700° C. for lhrs to develop CuCl particles of a size of about 70 nm in diameter in the glass. The glass disk is cut to obtain a plate (4×10×220 mm). The plate is heated to 600° C., at which temperature the glass exhibits a viscosity of about 2×10$^9$ poise, and is stretched at the rate of 150 mm/min under a load of 400 Kg/cm$^2$. As a result, the CuCl particles are elongated into a prolate shape (about 20× 750 nm, aspect ratio: 38:1) and are aligned in the glass as is observed by a transmission electron microscope.

The particle density of CuCl in the resulting glass is estimated to be 2×10$^{13}$/cm$^3$. The volume ratio of CuCi particles is calculated to be about 3.6×10$^{-3}$.

The resulting glass plate is polished to form a plate of about 0.5 mm thickness and is reduced in a hydrogen atmosphere at 400° C. for 3 hrs to obtain a polarizing glass. Polarizing properties, including the extinction ratio of the glass, are shown in Table 2. The thickness of reduced surface layer of the plate is about 20 μm. The CuCl particles are changed to metallic copper particles exhibiting aspect ratios of about 2–10:1 (the average metallic copper particles being about 20×120 nm in size with an aspect ratio of about 6:1). Vacancies result from the shrinkage accompanying the reduction of the CuCl particles. The metallic copper particles develop at either end of the space occupied by the CuCI particles (now the vacancies) and have a spheroid like shape. The calculated volume ratio of the metallic copper particles is about 9×10$^{-4}$.

EXAMPLE 7

A glass disk of the glass composition shown in Table 2 as sample (7) is prepared in accordance with the same procedures as those of Example 3. The resulting glass disk is reheated at 740° C. for 1 hr to develop CuCl particles of a size of about 110 nm in diameter in the glass. The glass disk is cut to obtain a plate (4×10×220 mm). The plate is heated to 610° C., at which temperature the glass exhibits a viscosity of about $1\times10^9$ poise, and is stretched at the rate of 100 mm/min under a load of 200 Kg/cm². As a result, the CuCl particles are elongated into a prolate shape (about 30×1000 nm, aspect ratio: 33:1) and are aligned in the glass as is observed by a transmission electron microscope. The particle density of CuCl in the resulting glass is estimated to be $6\times10^{12}$/cm³. The volume ratio of CuCl particles is calculated to be about $4.2\times10^{-3}$.

The resulting glass plate is polished to form a plate of about 0.5 mm thickness and is reduced in a hydrogen atmosphere at 420° C. for 4 hrs to obtain a polarizing glass. Polarizing properties, including the extinction ratio of the glass, are shown in Table 2. The thickness of reduced surface layer of the plate is about 30 μm. The CuCl particles are changed to metallic copper particles exhibiting aspect ratios of about 2–8:1 (the average metallic copper particles being about 30×150 mn in size with an aspect ratio of about 5: 1). Vacancies result from the shrinkage accompanying the reduction of the CuCl particles. The metallic copper particles develop at either end of the space occupied by the CuCl particles (now the vacancies) and have a spheroid like shape. The calculated volume ratio of the metallic copper particles is about $1.1\times10^{-3}$.

Figure 3:
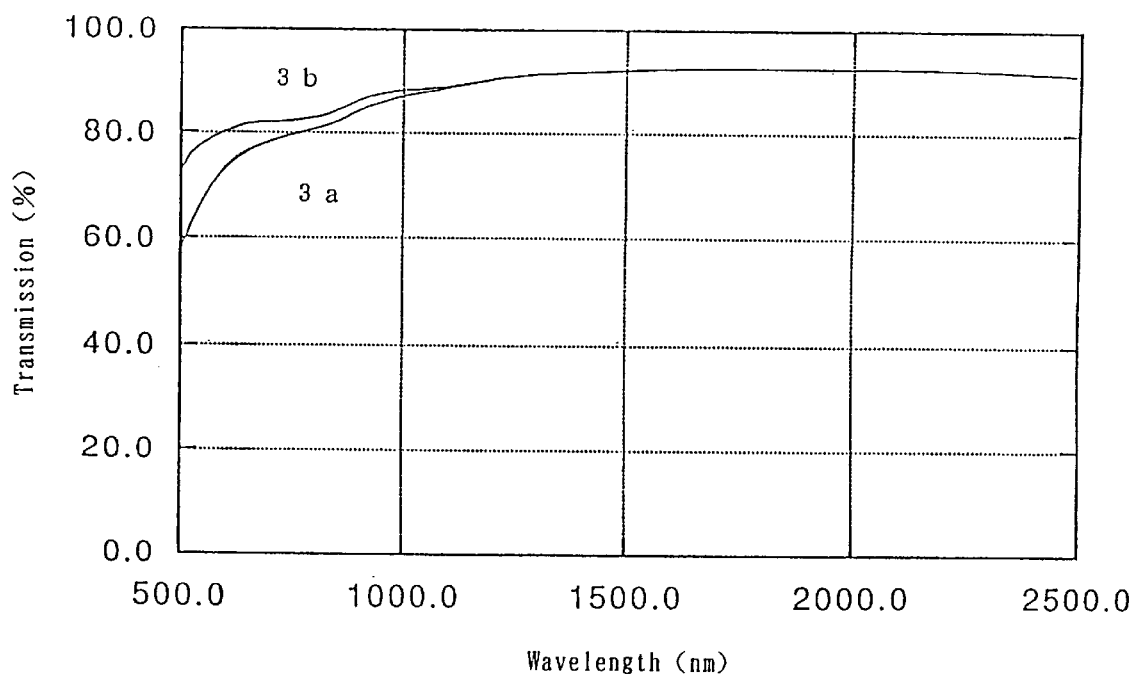
FIG. 3 shows transmission curves (3a and 3b) of the glass (thickness: 0.5 mm) of Example 7 prior to reduction.
Figure 4:
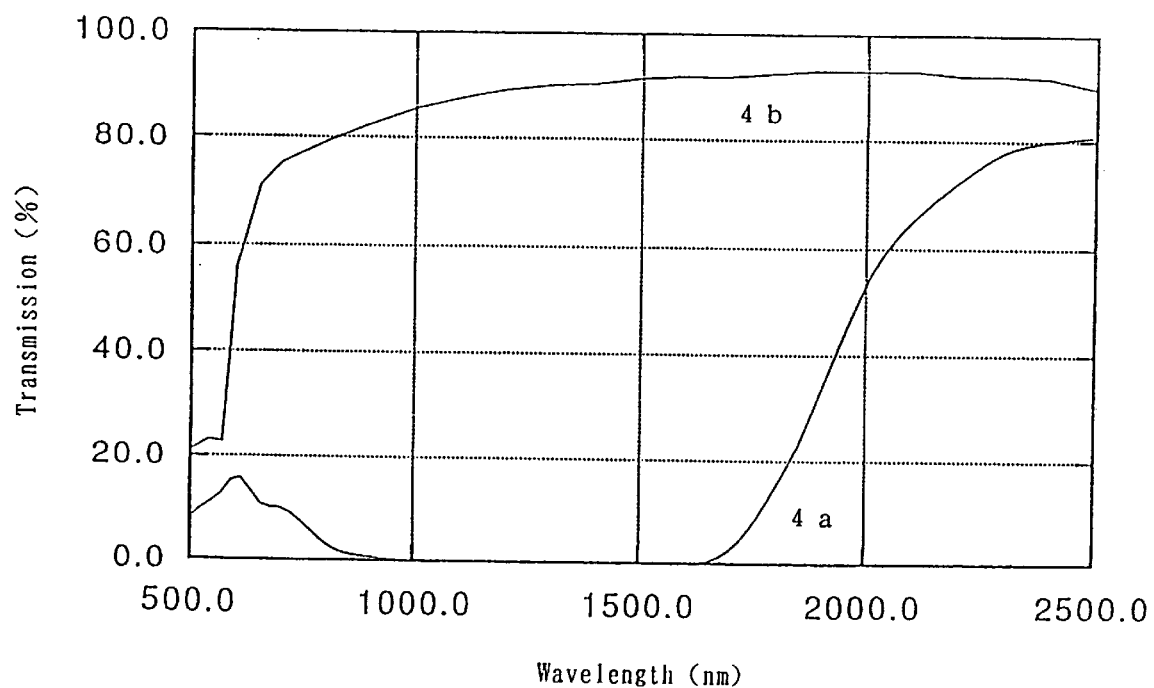
FIG. 4 shows transmission curves (4a and 4b) of the glass (thickness: 0.5 mm) of Example 7 after reduction.

Absorbances of the resulting plate are measured when the particles are oriented parallel to polarizing light [3a (before reduction) in FIGS. 3 and 4a (after reduction) in FIG. 4] and when the particles are oriented perpendicular to polarizing light [3b (before reduction) in FIGS. 3S and 4b (after reduction) in FIG. 4]. Since there are remarkable differences in the transmission between the glasses before and after reduction as shown in FIGS. 3 and 4, and. since metallic copper is identified by ESCA measurement, at least a portion of the CuCl particles in the surface layer o f the glass plate is reduced to form metallic copper. The above absorbances are measured without antireflection coating.

EXAMPLE 8

A batch of glass having the composition shown in Table 2 as sample (8) is prepared from $SiO_2$, $H_3BO_3$, $Al(OH)_3$, $Na_2CO_3$, NaCl, $AlF_3$, CuCl, SnO, etc, and is heated to 1400° C. (to melt) in a platinum crucible (3 liters). The melted glass is poured into a graphite mold to form a glass disk and is cooled gradually to room temperature. The resulting glass disk is reheated at 750° C. for 4 hrs to develop CuCl particles of a size of about 100 nm in diameter in the glass. The glass disk is cut to obtain a plate (5×10×100 mm). The plate is heated to 620° C., at which temperature the glass exhibits a viscosity of about $1\times10^9$ poise, and is stretched at the rate of 100 mm/min under a load of 200 Kg/cm² As a result, the CuCl particles are elongated into a prolate shape (about 60×960 nm, aspect ratio: 16:1) and are aligned in the glass as is observed by a transmission electron microscope. The particle density of CuCl in the resulting glass is estimated to be $3\times10^{12}$/cm³. The volume ratio of CuCl particles is calculated to be about $5.3\times10^{-3}$.

The resulting glass plate is polished to form a plate of about 0.5 mm thickness and is reduced in a hydrogen atmosphere at 500° C. for 4 hrs to obtain a polarizing glass. Polarizing properties, including the extinction ratio of the glass, are shown in Table 2. The thickness of reduced surface layer of the plate is about 50 μm. The CuCl particles are changed to metallic copper particles exhibiting aspect ratios of about 2–4:1 (the average metallic copper particles being about 50×150 nm in size with an aspect ratio of about 3:1). V acancies result from the shrinkage accomp anying the reduction of the CuCl particles. The metallic copper particles develop at either end of the space occupied by the CuCl particles (now the vacancies) and have a column like shape. The calculated volume ratio of the metallic copper particles is about $1.4\times10^{-3}$.

EXAMPLE 9

A glass disk of the glass composition shown in Table 2 as sample (9) is prepared in accordance with the same procedures as those of Example 8. The resulting glass disk is reheated at 800° C. for 1 hr to develop CuCl particles of a size of about 140 nm in diameter in the glass. The glass disk is cut to obtain a plate (5×10×100 mm). The plate is heated to 640° C., at which temperature the glass exhibits a viscosity of about $2\times10^9$ poise, and is stretched at the rate of 80 mm/min under a load of 250 Kg/cm². As a result, the CuCl particles are elongated into a prolate shape (about 50×1000 nm, aspect ratio: 20:1) and are aligned in the glass as is observed by a transmission electron microscope. The particle density of CuCl in the resulting glass is estimated to be $6\times10^{12}$/cm³. The volume ratio of CuCl particles is calculated to be about $8.6\times10^{-3}$.

The resulting glass plate is polished to form a plate of about 0.5 mm thickness and is reduced in a hydrogen atmosphere at 500° C. for 4 hrs to obtain a polarizing glass. Polarizing properties, including the extinction ratio of the glass, are shown in Table 2. The thickness of reduced surface layer of the plate is about 50 μm. The CuCl particles ar e changed to metallic copper particles exhibiting aspect ratios of about 2–6:1 (the average metallic copper particles being about 42×170 nm in size with an aspect ratio of about 4:1). Vacancies result from the shrinkage accompanying the reduction of the CuCl particles. The metallic copper particles develop at either end of the space occupied by the CuCl particles (now the vacancies) and have a spheroid like shape. The calculated volume ratio of the metallic copper particles is about $2.2\times10^{-3}$.

EXAMPLE 10

A glass disk of the glass composition shown in Table 2 as sample (10) is prepared in accordance with the same procedures as those of Example 3. The resulting glass disk is reheated at 750° C. for 1 hr to develop CuCl particles of a size of about 100 nm in diameter in the glass. The glass disk is processed to obtain a rod (50 mm#×50mm length). The rod is heated to 610° C., at which temperature the glass exhibits a viscosity of about $8\times10^8$ poise and is extruded under the pressure of 750 Kg/cm² to form a rod with 5 mm in diameter. As a result, the CuCl particles are elongated into a prolate shape (about 30×1000 nm, aspect ratio: 33:1) and are aligned in the glass as is observed by a transmission electron microscope. The particle density of CuCl in the resulting glass is estimated to be $6.2\times10^{12}$/cm³. The volume ratio of CuCl particles is calculated to be about $4.3\times10^{-3}$.

The resulting glass rod is polished to form a plate of about 0.5 mm thickness and the plate is reduced in a hydrogen atmosphere at 450° C. for 3 hrs to obtain a polarizing glass. Polarizing properties, including the extinction ratio of the glass, are shown in Table 2. The thickness of reduced surface layer of the plate is about 20 μm. It is observed by a transmission electron microscope that the CuCl. particles are changed to metallic copper particles, which develop at either end of the space occupied by the CuCl particles (now vacancies) and have a spheroid like shape. Average metallic copper particles are about 25×180 nm in size with an aspect ratio of about 7:1. The calculated volume ratio of the metallic copper particles is about $1.1×10^{-3}$.

Figure 5:
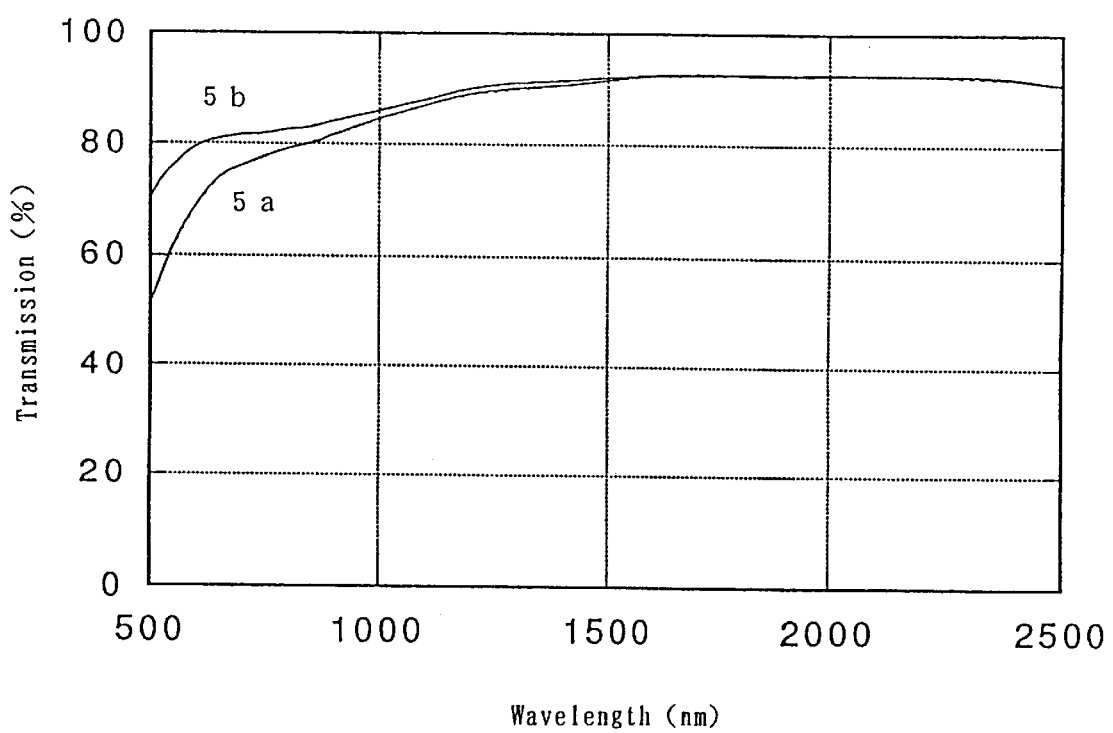
FIG. 5 shows transmission curves (5a and 5b) of the glass (thickness: 0.5 mm) of Example 10 prior to reduction.
Figure 6:
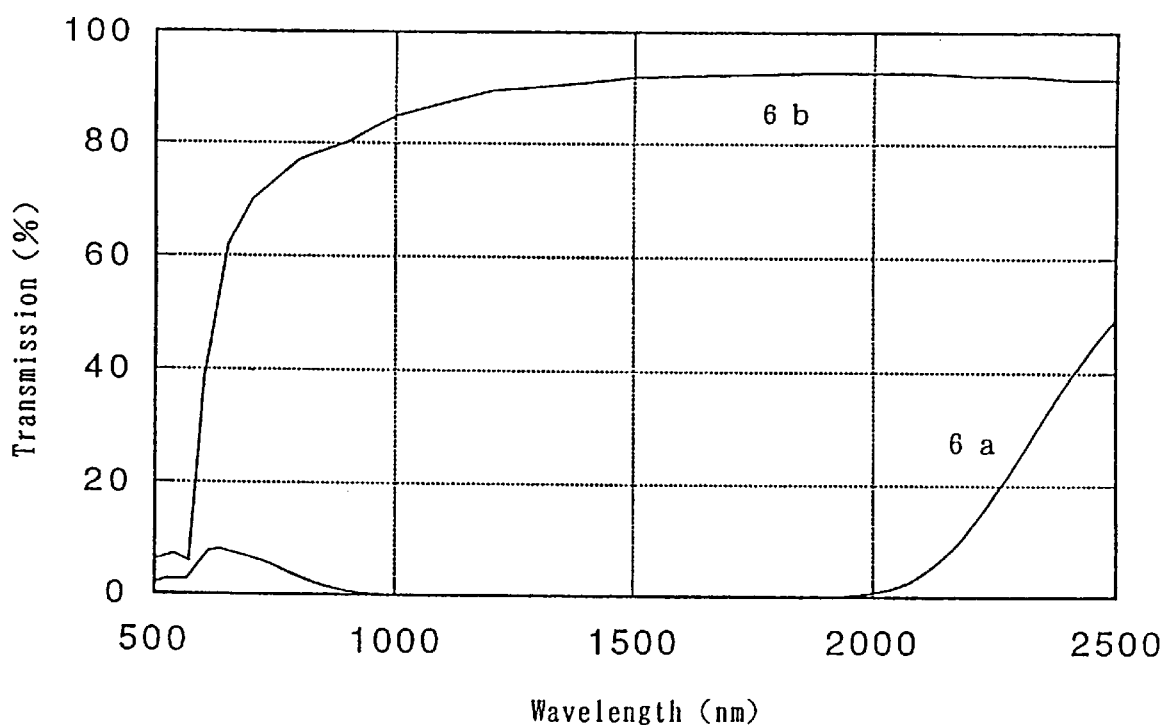
FIG. 6 shows transmission curves (6a and 6b) of the glass (thickness: 0.5 mm) of Example 10 after reduction.

Absorbances of the resulting plate are measured when the particles are oriented parallel to polarizing light [5a (before reduction) in FIGS. 5 and 6a (after reduction) in FIG. 6] and when the particles are oriented perpendicular to polarizing light [5b (before reduction) in FIGS. 5 and 6b (after reduction) in FIG. 6]. Since there are remarkable differences in the transmission between the glasses before and after reduction as is shown in FIGS. 5 and 6, and since metallic copper is identified by ESCA measurement, at least a portion of the CuCl particles in the surface layer of the glass plate is reduced to form metallic copper. The above absorbances are measured without antireflection coating.

EXAMPLE 11

A glass disk of the glass composition shown in Table 2 as sample (11) is prepared in accordance with the same procedures as those of Example 3. The resulting glass disk is reheated at 750° C. for 2 hrs to develop CuCl particles of a size of about 150 nm in diameter in the glass. The glass disk is processed to obtain a rod (50 mm#×50 mm length). The rod is heated to 640° C., at which temperature the glass exhibits a viscosity of about $3×10^8$ poise and is extruded under a pressure of 600 Kg/cm² to form a rod with a 5mm diameter. As a result, the CuCl particles are elongated into a prolate shape (about 45×1100 nm, aspect ratio: 24:1) and are aligned in the glass as is observed by a transmission electron microscope. The particle density of CuCl in the resulting glass is estimated to be about $2.5×10^{12}/cm^2$. The volume ratio of CuCl particles is calculated to be about $4.4×10^{-3}$.

The resulting glass rod is polished to form a plate of about 0.5 mm thickness and the plate is reduced in a hydrogen atmosphere at 450° C. for 3 hrs to obtain a polarizing glass. Polarizing properties, including the extinction ratio of the glass, are shown in Table 2. The thickness of the reduced surface layer of the plate is about 20 μm. It is observed by a transmission electron microscope that the CuCl particles are changed to metallic copper particles by the reduction, which copper particles develop at either end of the space occupied by the CuCl particles (now vacancies) and have a spheroid like shape. Average metallic copper particles have a diameter of about 40×220 nm in size with an aspect ratio of about 5.5:1. The calculated volume ratio of the metallic copper particles is about $1.2×10^{-3}$.

As is demonstrated in the above examples, if the volume of the elongated copper halide particles is larger, the shape of the metallic copper particles formed by reduction tends to be a corn like shape. If the volume of the elongated copper halide particles is smaller, the shape of the metallic copper particles tends to be a column or spheroid like shape. When the absorption peak is measured on the sample containing the corn like shape particles, in which the lengthwise direction of the particles is parallel to the surface of polarizing light, it tends to shift to a longer wavelength rather than that of the sample containing the spheroid like shape particles. The particle density shown in the above examples is obtained by counting the number of copper halide particles present in a certain area in a photograph of TEM (Transmission electron microscope) and calculating using the assumption that the thickness of the samples provided to TEM observation would be 300 nm.

The volume ratio of metallic copper particles in a reduced surface layer is calculated as follows:

A=Vcucl X d×0.25

A: volume ratio of copper particles

Vcucl: average volume occupied by a CuCl particle d: particle density (the number of CuCl particles present in a unit volume)

Vcucl is obtained by the equation: Vcucl=π×W²×⅙.

Wherein the length is 1, the breadth is w and the shape is assumed spheroid. d is obtained by counting the number of CuCl particles present in a certain area in a photograph of TEM and calculating using the assumption that the thickness of the sample provided to TEM observation would be 300 um. The constant 0.25 is obtained by theoretical consideration and observation, and means that the volume of metallic copper particles formed by reduction is approximately 0.25 times that of CuCl particles.

Definition and Method for Measurement of Extinction Ratio

The transmission observed when the polarizing light is perpendicular to the length of the particles is defined as T⊥(%) and that observed when the polarizing light is parallel to the length of the particles is defined as T∥ (%). The extinction ratio is defined by the relationship:

$$\text{Extinction ratio}=10\times\log(T\perp(\%)/T\|(\%))$$

Figure 9:
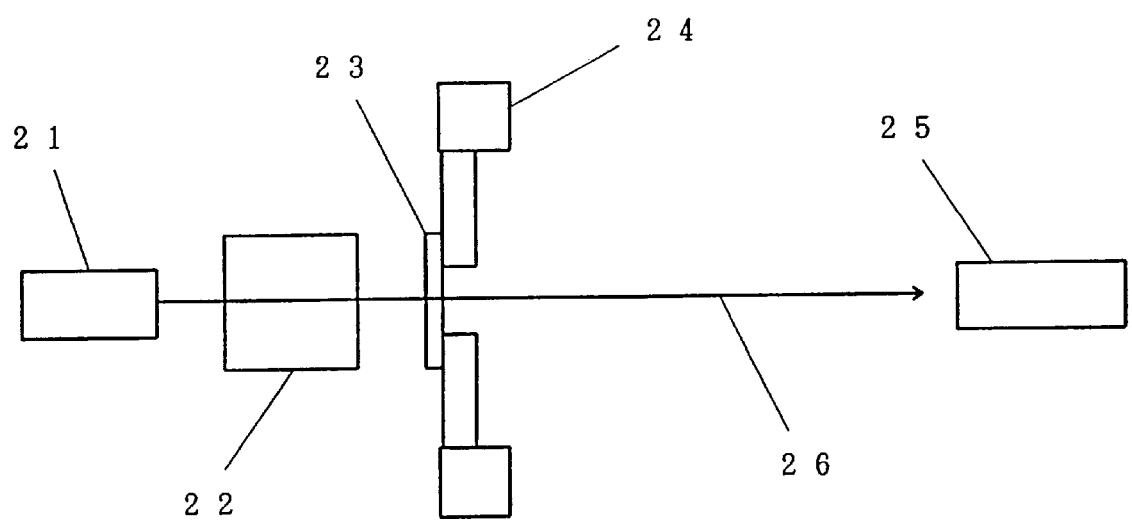
FIG. 9 is an explanatory chart of an apparatus for measurement of transmission.

The transmission is measured by the apparatus shown in FIG. 9. In FIG. 9, 21 is a semiconductor laser (light source), 22 is a Gran-Thomson type prism, 23 is a sample, 24 is a sample holder and 25 is a power meter. Sample holder 24 is rotatable around the hole through which the light travels. Collected light beam from the semiconductor laser 21 goes through prism 22 to form linear polarizing light, the power of light (Wo) which goes through the hole of holder 24 without any sample is measured. Then the minimum power of light ($W_{min}$) and maximum power of light ($W_{max}$) are measured by rotating holder 24 with sample 23.

$$T\perp\%=(W_{max}/WO)\times100$$

$$T\|\%=(W_{min}/WO)\times100$$

TABLE 1

Glass composition and Extinction ratio

| component | Example No. | | | | |
|---|---|---|---|---|---|
| (wt %) | 1 | 2 | 3 | 4 | 5 |
| SiO$_2$ | 59.9 | 56.0 | 59.6 | 51.7 | 56.0 |
| B$_2$O$_3$ | 20.0 | 22.3 | 20.0 | 29.5 | 17.5 |
| Al$_2$O$_3$ | 6.8 | 9.0 | 6.8 | 8.5 | 6.0 |
| AlF$_3$ | 2.0 | 2.0 | 2.0 | | 4.0 |
| Na$_2$O | 9.7 | 8.0 | 9.7 | 7.5 | 10.0 |
| NaCl | 1.0 | 1.5 | 1.0 | 1.5 | 2.0 |
| MgO | | | | | 3.0 |
| CaO | | | | | |
| CuCl | 0.8 | 1.5 | 0.8 | 1.0 | 1.2 |
| SnO | 0.1 | 0.1 | 0.1 | 0.3 | 0.3 |
| As$_2$O$_3$ | | 3.0 | | | |
| Absorption peak(μm) (1.31 μm) | 1.0 | 1.3 | 2.0 | 1.5 | 1.6 |
| Extinction ratio(dB) | 32 | 35 | 24 | 48 | >63 |
| Loss(dB) (1.55 μm) | 0.16 | 0.6 | 0.08 | 0.13 | 0.05 |

TABLE 1-continued

Glass composition and Extinction ratio

| component | Example No. | | | | |
|---|---|---|---|---|---|
| (wt %) | 1 | 2 | 3 | 4 | 5 |
| Extinction | | | | | |
| ratio(dB) | 16 | 21 | 30 | 50 | >63 |
| Loss(dB) | 0.1 | 0.15 | 0.05 | 0.1 | 0.04 |

TABLE 2

Glass composition and Extinction ratio

| component | Example No. | | | | | |
|---|---|---|---|---|---|---|
| (wt %) | 6 | 7 | 8 | 9 | 10 | 11 |
| $SiO_2$ | 57.5 | 57.5 | 30.0 | | 58.7 | 60.3 |
| $B_2O_3$ | 19.5 | 19.5 | 48.7 | 68.0 | 20.5 | 19.8 |
| $Al_2O_3$ | 8.9 | 8.9 | 10.0 | 15.0 | 7.0 | 6.4 |
| $AlF_3$ | 2.0 | 2.0 | | | 2.2 | 2.0 |
| $Na_2O$ | 9.8 | 9.8 | 9.0 | 2.0 | 9.7 | 9.7 |
| NaCl | 1.4 | 1.4 | 1.0 | 1.0 | 1.0 | 1.0 |
| MgO | | | | | | |
| CaO | | | | 12.0 | | |
| CuCl | 0.8 | 0.8 | 1.0 | 1.5 | 0.8 | 0.7 |
| SnO | 0.1 | 0.1 | 0.1 | 0.5 | 0.1 | 0.1 |
| $As_2O_3$ | | | 0.2 | | | |
| Absorption peak($\mu$m) | 1.5 | 1.3 | 1.2 | 1.4 | 1.5 | 1.5 |
| (1.31 $\mu$m) Extinction | | | | | | |
| ratio(dB) | >63 | >63 | 51 | 61 | 50 | 46 |
| Loss(dB) | 0.04 | 0.05 | 0.45 | 0.45 | 0.10 | 0.20 |
| (1.55 $\mu$m) Extinction | | | | | | |
| ratio(dB) | >63 | 50 | 19 | 46 | 51 | 47 |
| Loss(dB) | 0.04 | 0.04 | 0.12 | 0.1 | 0.05 | 0.08 |

EXAMPLE 12

Figure 8:
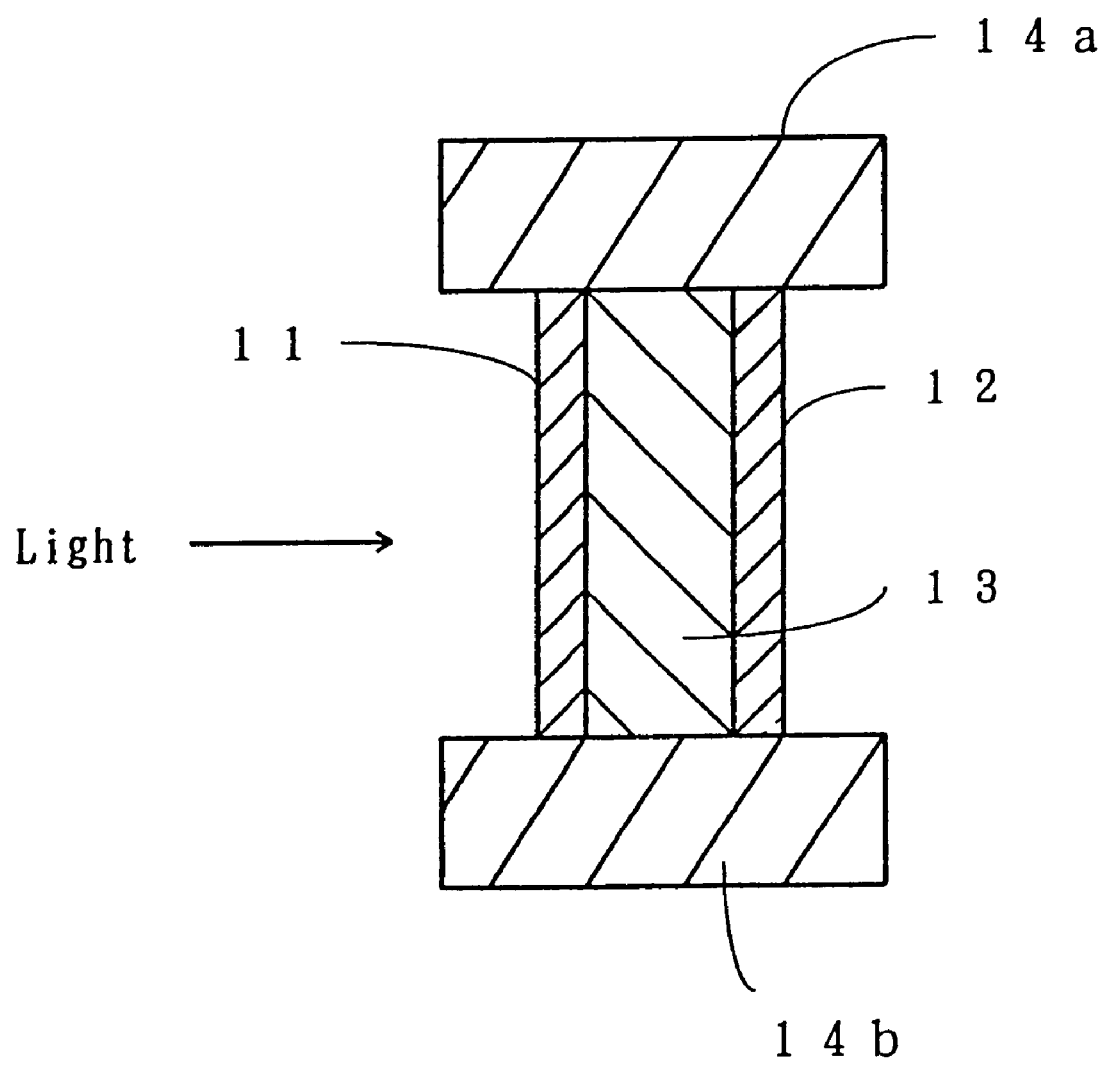
FIG. 8 is an explanatory figure of the isolator of Example 12 comprising polarizers 11 and 12 employing the polarizing glass articles of the present invention, magnetic garnet membrane 13 and Sn—Co magnets 14a and 14b.

In accordance with the procedures of Example 1, a glass disk containing CuCl particles is prepared, is elongated and is polished to form a glass plate having a thickness of 0.1 mm followed by a reduction treatment whereby a polarizing glass plate of the present invention is obtained. As shown in FIG. 8, an isolator for 1.31 $\mu$m comprising polarizers 11 and 12 employs the resulting glass plates, Faraday rotating garnet membrane 13 commercially available from Tokin CO. LTD. in Japan and Sm—Co magnets 14a and 14b are assembled. The thickness of the polarizers 11 and 12 is 0.1 mm and that of Faraday rotating garnet membrane 13 is about 0.4. The polarizers and the membrane are adhered with fused glass powder and the thickness of the fused glass layers is about 0.05 mm. It is also possible to adhere the polarizers and the membrane with adhesives. The distance between two polarizers of the resulting isolator (0.7 mm) is smaller than the effective beam diameter (1.2 mm) of a LD. The extinction ratio resulting from the isolator by irradiation of light having a wavelength of 1.3 $\mu$m from the LD is 30 dB.

EXAMPLE 13

In accordance with the procedures of Example 7, a glass disk containing CuCl particles is prepared, is elongated and is polished to form a glass plate having 0.1 mm in thickness followed by a reduction treatment whereby a polarizing glass plate of the present invention is obtained. An optical isolator is assembled by employing the polarizing plate in accordance with the same procedures of Example 12. The extinction ratio resulting from the isolator by irradiation of light having a wavelength of 1.3 $\mu$m from the LD is 48 dB.

EXAMPLE 14

A glass batch having the composition shown in Table 3 as sample (12) is prepared from $SiO_2$, $H_3BO_3$, $Al(OH)_3$, $Na_2CO_3$, NaCl, $AlF_3$, CuCl, SnO, etc., and is heated to 1450° C. (to melt) in a platinum crucible (3 liters). The melted glass is poured into a graphite mold to form a glass disk and is cooled gradually to room temperature. The resulting glass disk is reheated at 720° C. for 1 hr to deposit CuCl particles of a size of about 90 nm in diameter in the glass. This glass does not exhibit photochromic properties. The glass disk is cut to obtain a plate (5×10×220 mm). The plate is heated to 590° C., at which temperature the glass exhibits a viscosity of about $2\times10^9$ poise, and is stretched at the rate of 200 mm/min under a load of 500–1100 Kg/cm². As a result, the CuCl particles are elongated into a prolate shape (about 25×800 nm, aspect ratio: 32:1) and are aligned in the glass. The particle density of CuCl in the resulting glass is estimated as $7\times10^{12}/cm^3$ by observation using a transmission electron microscope. The volume ratio of CuCl particles is calculated to be about $2.7\times10^{-3}$.

The resulting glass plate is polished to form a plate of about 0.5 mm thickness and is reduced in a hydrogen atmosphere at 410° C. for 3 hrs to obtain a polarizing glass. The polarizing properties of the glass are shown in Table 3. The thickness of reduced surface layer of the plate, which contains metallic copper particles, is about 20 $\mu$m. The CuCl particles are changed to metallic copper particles exhibiting aspect ratios of about 2–8:1 (the average metallic copper particles being about 25×125 nm in size with an aspect ratio of about 5:1). Vacancies result from the shrinkage accompanying the reduction of the CuCl particles. The metallic copper particles develop at either end of the space occupied by the CuCl particles (now the vacancies), and have a spheroid like shape. The calculated volume ratio of the metallic copper particles is about $7\times10^{-3}$.

EXAMPLE 15

A glass batch having the composition shown in Table 3 as sample (13) is prepared from $SiO_2$, $H_3BO_3$, $Al(OH)_3$, $Na_2CO_3$, NaCl, $AlF_3$, CuCl, SnO, etc., and is heated to 1450° C. (to melt) in a platinum crucible (3 liters). The melted glass is poured into a graphite mold to form a glass disk and is cooled gradually to room temperature. The resulting glass disk is reheated at 800° C. for 3 hrs to deposit CuCl particles of a size of about 180 nm in diameter in the glass. This glass does not exhibit photochromic properties. The glass disk is cut to obtain a plate (5×10×220 mm). The plate is heated to 600° C., at which temperature the glass exhibits a viscosity of about $1\times10^9$ poise, and is stretched at the rate of 100 mm/min under a load of 200–600 Kg/cm². As a result, the CuCl particles are elongated into a prolate shape (about 50×2200 nm, aspect ratio: 44:1) and are aligned in the glass. The particle density of CuCl in the resulting glass is estimated as $4\times10^{12}/cm^3$ by observation using a transmission electron microscope. The volume ratio of CuCl particles is calculated to be about $1.2\times10^{-2}$.

The resulting glass plate is polished to form a plate of about 0.5 mm thickness and is reduced in a hydrogen atmosphere at 430° C. for 1 hrs to obtain a polarizing glass. The polarizing properties of the glass are shown in Table 3.

The thickness of reduced surface layer of the plate, which contains metallic copper particles, is about 20 μm. The CuCl particles are changed to metallic copper particles exhibiting aspect ratios of about 4–11:1 (the average metallic copper particles being about 45×360 nm in size with an aspect ratio of about 8:1). Vacancies result from the shrinkage accompanying the reduction of the CuCl particles. The metallic copper particles develop at either end of the space occupied by the CuCl particles (now the vacancies), and have a column like shape. The calculated volume ratio of the metallic copper particles is about $3 \times 10^{-3}$.

TABLE 3

Glass composition and Extinction ratio

| component (wt %) | Example No. | |
| --- | --- | --- |
| | 14 | 15 |
| $SiO_2$ | 54.5 | 53.5 |
| $B_2O_3$ | 26.5 | 24.5 |
| $Al_2O_3$ | 9.5 | 6.5 |
| $AlF_3$ | | 1.0 |
| $Na_2O$ | 8.3 | 8.2 |
| NaCl | 0.6 | 3.0 |
| MgO | | |
| CaO | | |
| CuCl | 0.57 | 2.4 |
| SnO | 0.03 | 0.9 |
| $As_2O_3$ | | |
| Absorption peak(μm) | 1.3 | 1.7 |
| (1.31 μm) Extinction ratio(dB) | 41 | 44 |
| Loss(dB) | 0.1 | 0.22 |
| (1.55 μm) Extinction ratio(dB) | 25 | 55 |
| Loss(dB) | 0.07 | 0.15 |

Where the invention has been described with preferred embodiments, it will be understood that variations and modifications may be resorted to as will be apparent to those skilled in the art. Such variations and modifications are to be considered within the purview and the scope of the claims appended hereto.

What is claimed is:

1. A non-photochromic borosilicate glass article suitable for base glass for a non-photochromic, light polarizing glass comprising the base glass with copper containing particles disposed therein, said copper containing particles including cuprous halide particles developed in said borosilicate glass upon reheating of the glass after its formation, said cuprous halide particles being elongated, wherein said borosilicate glass contains SnO and has a composition consisting essentially, expressed in terms of weight %, of 48–65% $SiO_2$, 13–33% $B_2O_3$, 6–13% $Al_2O_3$, 0–5% $AlF_3$, 7–17% alkali metal oxide, 0–5% alkali metal chloride, 0–5% alkali earth metal oxide, 0.5–2.5% of the sum of $Cu_2O$ and copper halide, and the ratio by weight of Cu/SnO being 1.7 to 12.3 and 0–5% $As_2O_3$.

2. A non-photochromic borosilicate glass article according to claim 1, wherein the content of SnO is 0.01 to 1.0 wt %.

3. A non-photochromic borosilicate glass article according to claim 1, wherein the content of SnO is 0.03–0.6% by weight.

4. A non-photochromic borosilicate glass article according to claim 1, wherein the content of SnO is 0.07–0.5% by weight.

5. The non-photochromic borosilicate glass article according to claim 1 wherein the Cu/SnO ratio is 2.2 to 9.6.

6. The non-photochromic borosilicate glass article according to claim 1, wherein the Cu/SnO ratio is 5.1.

* * * * *